United States Patent [19]

Doudnikoff et al.

[11] Patent Number: 5,499,333
[45] Date of Patent: Mar. 12, 1996

[54] METHOD AND APPARATUS FOR AT LEAST PARTIALLY INSTANTIATING AN OBJECT IN A COMPOUND DOCUMENT USING THE OBJECT'S PARENT CLASS CONFIGURATION DATA WHEN THE OBJECT'S CONFIGURATION DATA IS UNAVAILABLE

[75] Inventors: Gregory M. Doudnikoff, Raleigh; Richard J. Redpath, Cary, both of N.C.

[73] Assignee: International Business Machines Corporation, Armonk, N.Y.

[21] Appl. No.: 425,838

[22] Filed: Apr. 20, 1995

[51] Int. Cl.$^6$ ................................................. G06F 17/30
[52] U.S. Cl. ..................... 395/153; 395/147; 395/600; 364/419.19; 364/DIG. 2; 364/943
[58] Field of Search ........................ 395/145, 147, 395/148, 153, 154, 600, 700; 364/419.17, 419.19

[56] References Cited

U.S. PATENT DOCUMENTS 5,339,438  8/1994  Conner et al. ................ 395/700
5,341,478  8/1994  Travis, Jr. et al. ........... 395/200.03
5,418,964  5/1995  Conner et al. ................ 395/700
5,421,016  5/1995  Conner et al. ................ 395/700

OTHER PUBLICATIONS

Ibrahim et al, "Instance Specialization with Delegation", *Journal of Object Oriented Programming*, Jun. 1991, pp. 53–56.

*Primary Examiner*—Thomas G. Black
*Assistant Examiner*—John C. Loomis
*Attorney, Agent, or Firm*—Edward H. Duffield

[57] ABSTRACT

When an original object is created by a user, the invocation of an object of a given class initiates storage of the load information for an object of that class in the compound document specification. In addition, the document creation process must include a process for checking whether objects of the desired class have hierarchical parents, i.e. superclasses, defined to exist, and if they do, these one or more superclass load information sets must also be loaded with the load information for the object created by the user. It is this information which is utilized at a displaying user's computer system when a failure to instantiate and display a part of a given class or type occurs, so that the display process can resort to the hierarchical superclass definitions and use the superclasses instantiation load information instead.

4 Claims, 4 Drawing Sheets

METHOD AND APPARATUS FOR AT LEAST PARTIALLY INSTANTIATING AN OBJECT IN A COMPOUND DOCUMENT USING THE OBJECT'S PARENT CLASS CONFIGURATION DATA WHEN THE OBJECT'S CONFIGURATION DATA IS UNAVAILABLE

FIELD OF THE INVENTION

This invention relates generally to computer programming and to computer application program system facilities in a computer or network of computers. More specifically, it relates to mechanisms and techniques for successfully instantiating for display objects in part classes or object classes whenever the computer on which a user desires to display an instantiation of such a part lacks the necessary part handler for instantiating the part or the class which is desired. Particularly, in object oriented programming, part or object handlers (e.g., viewers and editors for parts) for instantiating and displaying objects of a given class exist, but a given user's system may lack one or more required part handlers to successfully display all the objects in a compound document or set of objects which had been originally created by a user having the necessary part handlers in his or her computer system.

PRIOR ART

Open document interchange and display architectures, useful for word processors, spread sheet applications, and the like, are becoming well-known in the software industry. One example is the OpenDoc architecture in which compound documents, that is documents made up of parts of many different types or classes, can be constructed by a user to contain text, video images, sound objects, mathematical calculations or the like simultaneously. The OpenDoc architecture is described in IBM OpenDoc OS/2 Programming Guide, Copyright 1994, 1995 IBM Corporation. Using its architecture, users may employ software for document production utilizing a variety of part handlers. The resulting compound document may be sent to another user or set of users whose system or systems may not have the necessary part handlers to render or instantiate some one or more of the imbedded objects or parts. This is an existing problem in the industry and, as documented by one vendor, the solution for handling such a situation is that a framed area within the compound document where the part would normally be instantiated or displayed, is simply grayed out and no useful data appears in that area.

The part handlers are themselves small application programs dedicated to the task of creating, editing and displaying an example of an object of the class of the sort they handle utilizing load information of the object type that will be present from the user's document from its creation. To instantiate an example of the object type desired means to set aside storage in the computer system to hold the load information of that object type in association with part handler of the appropriate capability for the type of part envisioned. The part handler uses the instantiation information (that is the load information) to perform the function of the object type which it handles. For example, a math part handler as described in a co-pending, commonly assigned patent application Ser. No. 08/354,687, SYSTEM AND METHOD FOR INTEGRATING COMPUTATIONS INTO COMPOUND DOCUMENTS, which is incorporated herein by reference, may be used to instantiate and display mathematical objects, equations, formulas, symbols and the like found in a compound document. However, if a compound document containing mathematical parts is encountered at a user's computer or workstation where the desired math part handler function is not available, such a user displaying a compound document containing such parts will be faced, under the prior art technique, with a document containing neither its text, for example, nor the mathematical portions that were desired to be displayed with the text.

OBJECT OF THE INVENTION

In light of the foregoing shortcomings with the known prior art, it is an object of this invention to provide and improved method of using a default mechanism to select an alternative part handler to instantiate for display a part from an object class for which the user's system lacks the necessary part handler or part viewer.

It is a further object of this invention to provide an improved object loader for successfully instantiating compound document objects or objects in general when a part handler (viewer) of the type needed for a particular part of class of parts is not available.

SUMMARY OF THE INVENTION

In accordance with the preferred embodiment of the invention, the aforementioned objects to solve the problem present in the prior art is constituted by a process utilizing, as a default when a necessary part handler is not available, the next highest hierarchical object class part handler that may be present in the user's system. When an original object is created by a user, the invocation of an object of a given class initiates storage of the load information for an object of that class in the compound document specification. In addition, the document creation process must include a process for checking whether objects of the desired class have hierarchical parents, i.e. superclasses, defined to exist, and if they do, these one or more superclass load information sets must also be loaded with the load information for the object created by the user. It is this information which is utilized at a displaying user's computer system when a failure to instantiate and display a part of a given class or type occurs, so that the display process can resort to the hierarchical superclass definitions and use the superclasses instantiation load information instead. The user's computer system, which lacks the specific part handler for the object type, will usually include the generic or superclass part handler for other parts of the generic type. While this may not provide a full display of all of the incidental information in a given object, it will usually suffice to display the object itself and its general parameters or configuration instead of displaying merely a grayed out or blank box in a compound document display.

BRIEF DESCRIPTION OF THE DRAWINGS

The invention will be described in detail with reference to a preferred embodiment as illustrated in the accompanying drawings in which.

DETAILED DESCRIPTION OF THE PREFERRED EMBODIMENT

Figure 1:
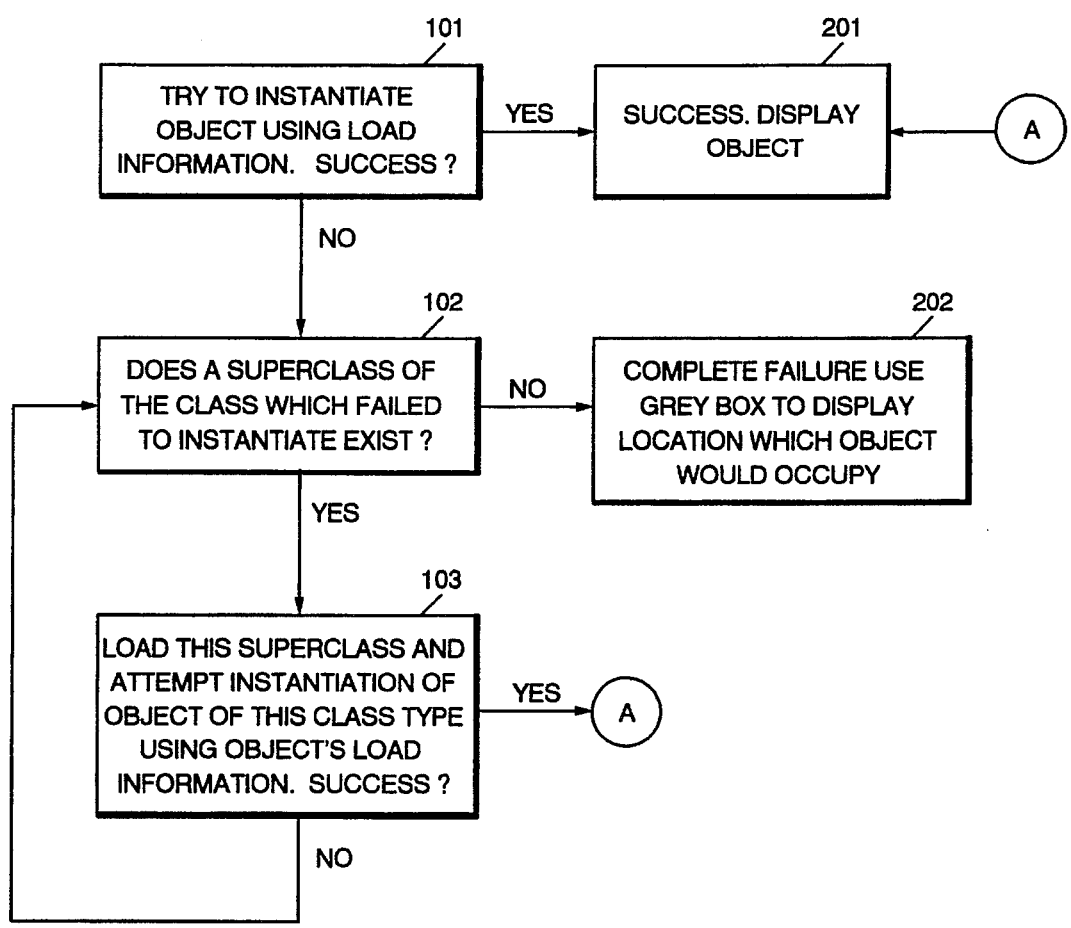
FIG. 1 schematically depicts steps in a method for loading an instance of an object at a user's computer where the display of a compound object or document is desired.

The preferred embodiment will be illustrated in the drawings and described in the specification with reference to the OpenDoc system of architecture for constructing compound documents as an example. However, the hierarchical default loading and display technique that will be described is applicable to any compound object or compound document architecture generally, since all of these employ hierarchical classes of parts and part handlers for objects of each hierarchical type.

At the outset, several definitions may be set forth. Under OpenDoc, load information for a given object is constituted by data in the format "class name: dll name" (where "DLL" stands for Dynamically Linked Library); information in this format is stored persistently in memory and in the text of a given document. For example, the class name for a mathematical part object is "math class" and is specified under OpenDoc as SWSMath.dll. The OpenDoc architecture will thus store a string "Math Class: SWSMath". Whenever the OpenDoc architecture system needs to instantiate a math class object, it will look for a math class dll, "SWSMath.dll". This will be the load information that will instruct a math part handler as to what is to be instantiated and displayed.

Instantiate or instantiation means to set aside storage in the document and in computer memory to hold the load information for a given object type.

A part handler under OpenDoc is actually a small application program which allows users to instantiate information to perform functions of the type called for by the object type being handled. For example, a math part contains the application routines for performing the mathematical functions specified in a given math object and for displaying them in the desired area of a compound document.

Figure 4:
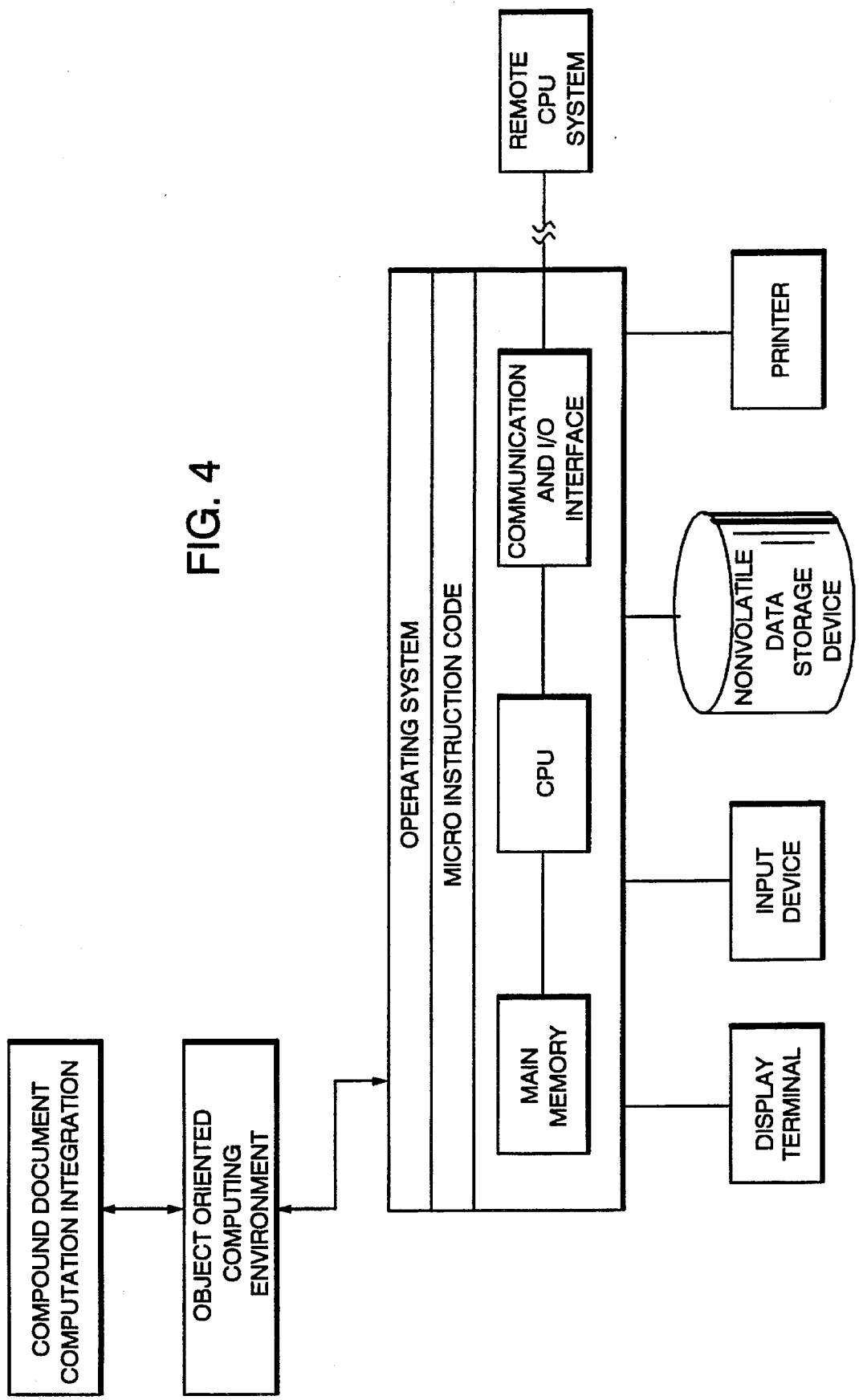
FIG. 4 illustrates schematically an overall computer system and network in which the invention may be implemented for display of compound objects or documents of processors which may lack an appropriate part handler for one or more parts used originally in constructing said compound object or document.

In reading or processing a compound document data list for display at a user's computer such as a terminal or personal computer (PC), the user's computer or CPU, such as that shown in FIG. 4, will read the specifications in the document and will try to instantiate each object found using the load information found in the document for that object. If a math part, for example, is found in the specified document, the user's computer searches memory for the SWSMath.dll and for the math part handler routine. If both are found, the math part is successfully instantiated and may be displayed on the display of the user's computer or workstation in the desired area of the document where it was intended to appear. This is shown in boxes 101 and 201 of FIG. 1.

However, if an appropriate part handler for the math part is not found, the user's system utilizing the process as depicted in FIG. 1, as a preferred embodiment of the invention, searches memory for whether a superclass of the class which failed to instantiate exists. This is done in box 102. If no superclass is found in the load information for the object or part which failed to instantiate in steps 101 and 201, failure is indicated as shown in box 202 and gray box would be displayed in the area the object would normally occupy.

However, if a superclass of the failed instantiation class does exist, its information will be found in the text specification as the result of the original building routine that will be described later with regard to FIG. 3. The user's system will then look in memory for the part handler for the superclass, as shown in box 103 of FIG. 1, and will load the superclass information to instantiate an object of the general class type which the superclass describes, which loops the process back to box 201 with a successful display of the object. If the superclass for the class which failed to instantiate is not found, the process loops back to box 102 to check if a still further superclass to the superclass which failed to instantiate happens to exist in the user's system, and the process repeats until either no superclasses are found, or a superclass having capability to display a generic object of its class type is found and utilized to display an object.

Figure 2:
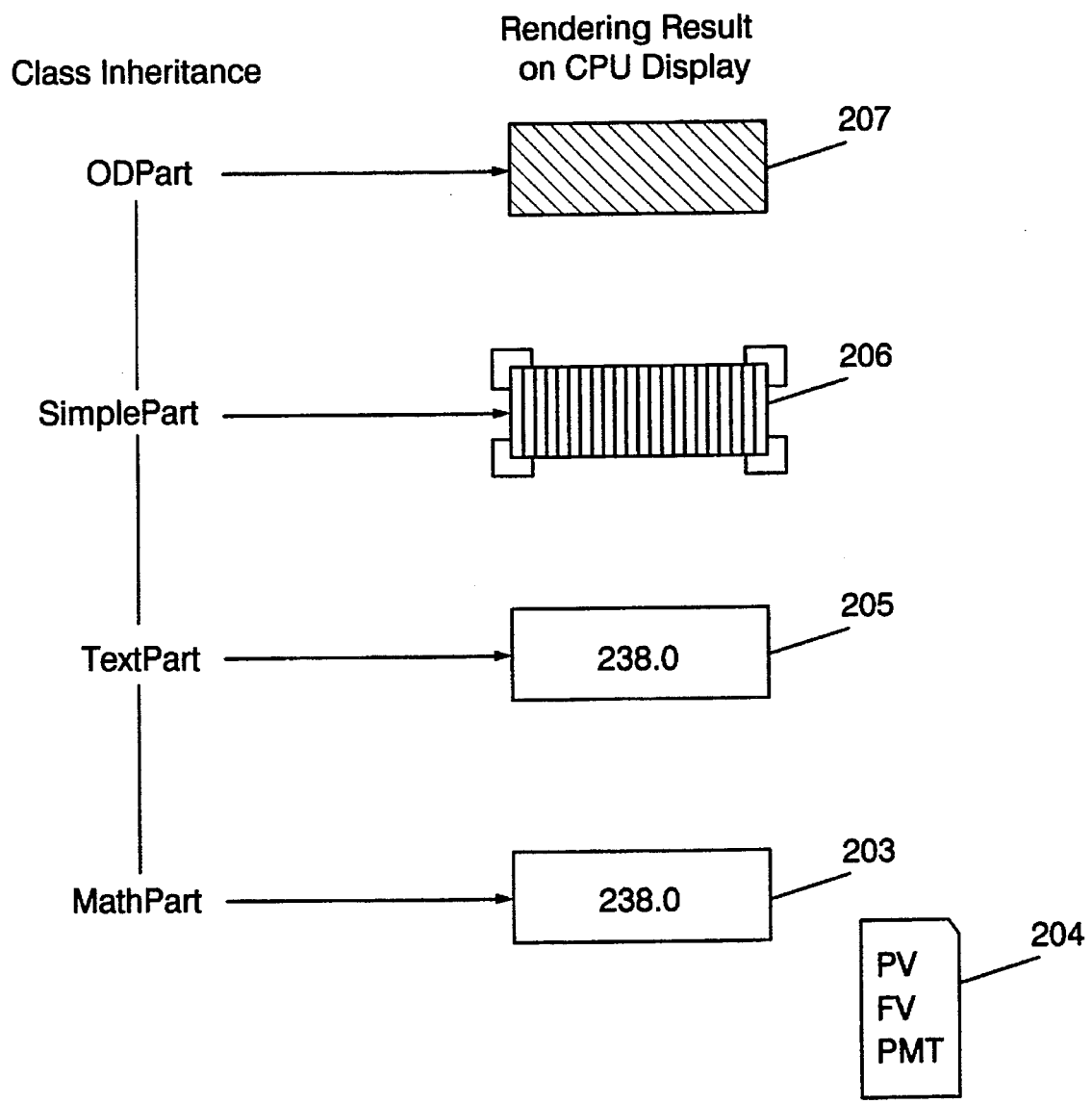
FIG. 2 schematically depicts the potential results of applying the process of program for loading an instance of an object as depicted in FIG. 1, when a part handler for an object of a particular type is not present in the user's system.

For example, turning to FIG. 2, it may be seen that the class inheritance or hierarchy in the OpenDoc architecture for a math part has a succession of hierarchies in which the math part is succeeded by a superclass "text part", which itself is succeeded by the superclass "sample part" which is succeeded by the overall superclass "OD part" (or object definition part). The result of operating a math part against a set of load information is depicted also in FIG. 2 in which a small box 203 with the numerals 238.0 is shown as it would appear on the display of a computer or workstation. In addition, since the math part part-handler is used in rendering the result displayed, the pop-up menu shown as box 204, adjacent to box 203 which has the numeral display, is also available. The pop-up menu contains typical parameters that may be associated with the specific math part. For example, if the math part were an amortization function, the present value, future value, or the present amortized total parameters may be displayed.

The result of instantiating the math object utilizing the superclass text part handler is shown in FIG. 2 as the box 205, which contains the same numerical data but, as the text part handler does not have the math part handler full function, no pop-up menu with the math part parameters for control or selection is available. The next highest superclass in the math part's hierarchy is the simple part handler. This handler is incapable of displaying more than a simple locked out area where the load information for a given math part object could be displayed and the same is true for the highest class OD part handler. Both of these latter results are shown as boxes 206 and 207, respectively, in FIG. 2.

The text class, the simple part, and OD part class handlers are normally shipped with a base system in an OpenDoc architecture application. That is, each user installing the OpenDoc system and the link code will automatically install the text class, simple part class, and OD part classes and their handlers. The math class will typically be a part handler available or licensed separately, but may be installed by a user who wishes to use the math part in constructing compound documents where many mathematical functions or results are desired. Such a user could, using the math part in constructing compound documents, construct the documents and electronically mail them or physically transmit them to another user's computer system via known means, such as a modem or LAN, which does not have resident in memory the math part handler, math class. Utilizing the invention as depicted in FIGS. 1 and 2, this user will still, however, be able to instantiate and see the mathematical data, but perhaps not the additional functions provided by the math class part handler itself.

As shown in FIG. 2, the superclass for the math part is the text part or, viewed as class names, the superclass of math class is text class. The superclass of the text part class is the simple part class. The superclass of the simple part class is ODPart class. Each class or part requires a full set of DLLs in the OpenDoc architectural system. The DLLs for the math class or math part would be SWSMath.DLL, TXT.DLL, Simple.DLL, and the ODPart.DLL. It will be noted that the load information specifying the DLLs for the superclasses for the math class will be loaded in accordance with the invention as will be described shortly with reference to FIG. 3.

The text class specification will be TXT.DLL, the simple part class specification will be Simple.DLL, and the ODPart class specification will be ODPart.DLL.

As has been previously alluded to, a builder process and routine must be utilized by the user creating the OpenDoc compound document to enable operation of the invention. The function of the building routine is to store the load information for the desired object persistently in the text specification for the compound document, and also to check for the existence of, and to similarly load, the definitions for any superclass of the class of objects for which the load information is being stored.

Figure 3:
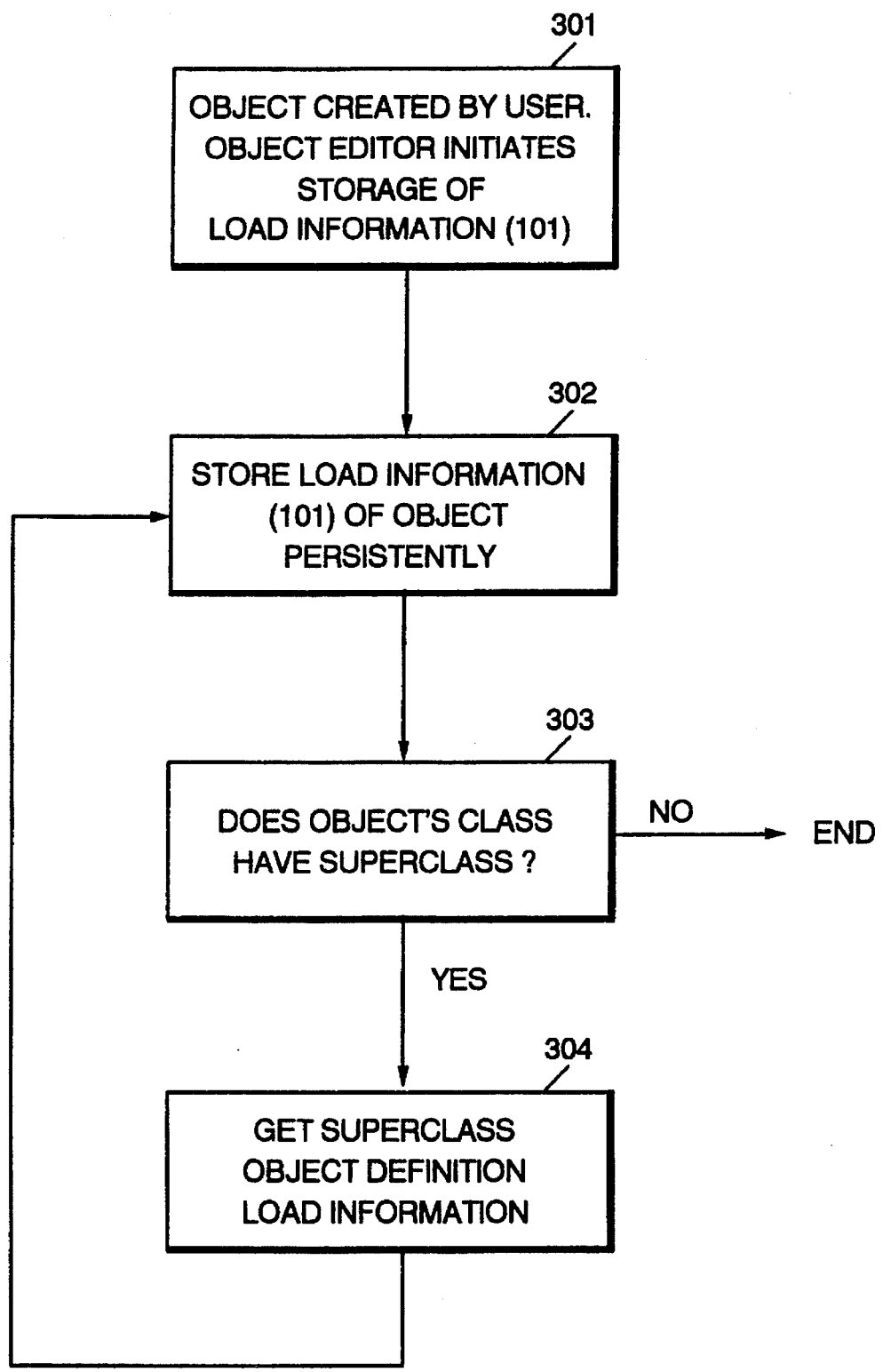
FIG. 3 schematically depicts the compound object or document building routine which stores persistently the load information regarding a given object created at a document or compound object creation station.

Turning to FIG. 3, the process begins at step 301 where an object created or selected by a user initiates the storage of load information in an OpenDoc environment. The load information would be, as described above, the class name: DLL name. In our example, using a math part, this would be math class: SWSMath. DLL. The process then continues to Box 302 in FIG. 3, where the load information of the object is stored persistently as part of the text of the compound document and the process continues to block 303 where an inquiry is made to determine whether the object of the desired class has a superclass of objects. If the answer is no, the process ends. However, if a superclass of the object of the class which is being created does exist, the superclass load information is obtained in block 304 and the process returns to block 302 where its information is stored. The process is continued until all superior hierarchical superclass information for a given object has been discovered and stored. The example given above for the math class illustrates the result of the process in FIG. 3 where the math class is specified by the load information persistently stored SWSMath.DLL, TXT.DLL, Simple.DLL, ODPart.DLL.

FIG. 1, therefore, schematically depicts an instantiation error recovery method and program for embodying the method which will load an instance of an object when the necessary object part handler fails to exist in the user's system. It provides substantial function, rather than complete failure, in order to instantiate the desired object when the object handler for the desired object does not exist on another user's computer system or apparatus. The desired object will be loaded and instantiated by reference to its load information in the OpenDoc text, which persistently stores the data for an object loader provided to it by the computer system and apparatus at the document creation user's computer as was described with reference to FIG. 3. The load information, when detected at a displaying user's computer, will bind the appropriate object handler to instantiate the object. If the object handler for the specific type of object is present in the displaying user's system, it will be instantiated and displayed as shown in FIG. 1. Otherwise, a failure condition will be encountered, but is resolved by the present invention upon inquiring whether a superclass of the class of object which failed to instantiate does exist at the displaying user's computer system. If such a superclass does exist, then its instantiation capabilities are used to display the object to the extent possible. In the example described above, where a math part class object was to be instantiated, the load information indicates a math part object handler is needed to instantiate the math part object. The math part object handler will normally provide the function of rendering for display the math text information and the mathematical function pop-up menu, as described with reference to FIG. 2. If the math part handler is not present in the displaying user's computer system or apparatus, the math part object would ordinarily fail to instantiate. However, as described with reference to the present invention, the next possible source of instantiation control function for the math part object is the text part class, which requires the text part object handler, which normally does exist in every user's system, as it is one of the base object handlers and classes shipped at installation to all OpenDoc users. The text part object handler provides the user with a rendered display of information of the text that may fail to display the pop-up menu. Nevertheless, the conveyance of the textual information intended by the original document creator has been substantially achieved without the obligation, on the displaying user's part, for purchasing and installing a math part handler.

The improved object loader as shown in FIG. 2 consists of a series of procedural steps which define a method for successfully instantiating and displaying an object of a given class where the part handler for that class is not present in a displaying user's system.

Having thus described the invention with reference to a preferred embodiment thereof, it will be apparent to those with skill in the art that the general handling technique and object loader for instantiating a defined object when a user lacks an appropriate part handler may be employed not only in the OpenDoc compound document architecture, but in any compound object creation and display environment, wherefore, what is desired to be protected by Letters Patent and what is claimed is set forth in the following claims by way of example and not of limitation, wherefore

What is claimed is:

1. A computer implemented method of displaying on a computer system display, compound objects composed of plural object types wherein said computer system does not have a corresponding part handler for one or more said object types, comprising steps in said computer of:

attempting to display each said object and, for any said object which cannot be displayed due to the lack of a proper part handler corresponding to the type required for said object;

determining if the hierarchical class of said object type which could not be displayed has an existing superclass in said computer system, and if a superclass of said object's hierarchical class is found to exist, employing the part handler of said superclass to display said object; but if a superclass of said class of said object type which could not be displayed does not exist in said computer sysem, repeating said determining step to determine whether a superclass does exist for said superclass which was not found to exist and, if such a class does exist, repeating said employing step using the part handler of said superclass' superclass; and repeating said steps until either a usable part handler is found for a superclass or said class structure is exhausted.

2. An object loader for instantiating a defined object using said object's load information, comprising:

means for attempting an instantiation of said object;

means responsive to a failure of said attempted instantiation, for determining whether a superclass of objects exist for objects of the type which failed said attempted instantiation; and if a said superclass is found to exist, means responsive to said determining, for attempting instantiation of an object of the type of said superclass using the load information of said superclass and the content specification of said object whose instantiation attempt failed.

3. An object loader as described in claim 2, further comprising:

means, responsive to a failure of said attempted instantiation of said object of said superclass type, for repeating said determining to find whether a still higher superclass of said failed superclass instantiation attempt exists, and if a said further higher superclass does exist, repeating said attempt at instantiation for said object whose original instantiation attempt failed.

4. An object loader as described in claim 3, and further comprising:

means for repeating said determining an attempted instantiation and responsive to a failure of said attempted instantiation until either said instantiation attempt succeeds or no further said superclasses are found for said object whose original instantiation attempt failed.

* * * * *